United States Patent
Hezemans

(10) Patent No.: US 8,179,751 B2
(45) Date of Patent: May 15, 2012

(54) METHOD AND DEVICE FOR SENSITIVITY COMPENSATION

(75) Inventor: Cees Hezemans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1023 days.

(21) Appl. No.: 11/720,623

(22) PCT Filed: Nov. 29, 2005

(86) PCT No.: PCT/IB2005/053948
§ 371 (c)(1),
(2), (4) Date: Jun. 1, 2007

(87) PCT Pub. No.: WO2006/059276
PCT Pub. Date: Jun. 8, 2006

(65) Prior Publication Data
US 2010/0020656 A1  Jan. 28, 2010

(30) Foreign Application Priority Data
Dec. 2, 2004 (EP) .................................... 04106243

(51) Int. Cl.
*G11B 7/00* (2006.01)
(52) U.S. Cl. ................................... 369/44.25
(58) Field of Classification Search ............... None
See application file for complete search history.

(56) References Cited

U.S. PATENT DOCUMENTS 5,173,598 A  12/1992  Bakx
(Continued)

FOREIGN PATENT DOCUMENTS

| EP | 1439537 A2 | 7/2004 |
|---|---|---|
| JP | 61148631 | 7/1986 |
| JP | 04325971 | 11/1992 |
| JP | 09198665 | 7/1997 |
| JP | 2003281748 | 10/2003 |
| WO | WO2004013848 A1 | 2/2004 |

(Continued)

OTHER PUBLICATIONS

International Search Report of International Application No. WO2006059276, Published Jun. 8, 2006.

*Primary Examiner* — Joseph Haley

(57) ABSTRACT

Method and device for generating a control voltage for a position actuator of a disk drive system for displacing a lens of a pick-up unit to a given X-position. The actuator is operated by an open loop control system. First, parameters of the control system are calibrated so that the control system produces a control voltage (Va) from an input position signal (Xact setp). Then, the control voltage is processed in a feed forward system for generating a processed control signal (Va_p) which is fed to the position actuator for displacing said lens to the X-position. A Z-value corresponding to the axial distance of the lens from a calibrated axial position and a temperature of the pick-up unit are measured. The position actuator operates according to the formula: $Xdc=Va\_p*K(Temp,Z)/(R(Temp)*C(Temp,Z))$ in which: Xdc=position signal for said given position Va_p=Va processed K=property of 'actuator' 21: Newton/Ampere R=resistance of 'actuator' coil C=Spring constant in Newton/meter. The Va_p is calculated according to the following formula: $Va\_p=Xact\ setp*Cal*S(Temp\_cal,Z\_cal)/S(Temp\_write,Z\_write)$ in which Cal is the result of the calibration $S(Temp,Z)=(A\_T+B\_T*Temp+C\_T*TempA2)*(A\_Z+B\_Z*Vz+C\_Z*VzA2)$ wherein A T, B T, C T, A Z, B Z, C Z are constants; Vz is the voltage across the Z actuator, Temp cal and Vz cal are the temperature and Vz, respectively, during calibration, Temp write and Vz write are the temperature and Vz, respectively during writing.

13 Claims, 2 Drawing Sheets

U.S. PATENT DOCUMENTS

| | | |
|---|---|---|
| 5,331,615 A | 7/1994 | Yamada et al. |
| 6,005,742 A | 12/1999 | Cunningham et al. |
| 6,301,207 B1 * | 10/2001 | Isokawa et al. ............ 369/44.36 |
| 6,342,985 B1 | 1/2002 | Clare et al. |
| 6,594,106 B1 | 7/2003 | Serrano et al. |
| 6,771,297 B2 | 8/2004 | Bronson |
| 2003/0179486 A1 | 9/2003 | Ho et al. |
| 2004/0141385 A1 * | 7/2004 | Pettigrew et al. ............. 365/200 |
| 2005/0057639 A1 * | 3/2005 | Van Brocklin et al. ....... 347/225 |

* cited by examiner

METHOD AND DEVICE FOR SENSITIVITY COMPENSATION

The present invention relates to the field of control of actuators, especially for optical disk drives. The actuator is controlled by a control system of the drive for displacing a lens of a pick-up unit to a given position.

An optical storage disk comprises a storage space in the form of at least one track, either in the form of a continuous spiral or in the form of multiple concentric circles. The disk may be a CD, DVD or BD.

For writing or reading information, an optical disk drive comprises rotating means, such as a spindle motor, for receiving and rotating an optical disk, and optical means, such as a laser, for generating an optical beam and for scanning said tracks.

For optically scanning the rotating disk, the drive comprises an objective lens for focusing the light beam into a spot on the disc and an optical detector for receiving light reflected from the disc and generating an output signal.

During operation, the light beam is focused on the disk by means of a focal actuator arranged for controlling an axial position of the lens. Moreover, the light beam is aligned with the tracks and/or capable of being positioned with respect to a new track by means of a radial actuator arranged for controlling the radial position of the lens.

The optical drive may comprise a sledge, which is displaceably guided with respect to a disc drive housing which also houses the spindle motor for rotating the disk. A sledge actuator is arranged to displace the sledge in substantially the radial direction over a distance at least corresponding to a range from an inner track radius to an outer track radius of the disk.

The sledge may be intended for course radial positioning of the optical lens. For fine-tuning of the position of the optical lens, the sledge is provided with a lens platform carrying the lens and a platform actuator arranged to displace the platform in relation to the sledge in the radial direction. The displacement range of the platform may be small compared to the displacement range of the sledge but the position accuracy of the platform in relation to the sledge may be better than the position accuracy of the sledge with respect to the housing.

The platform actuator may have a faster response than the sledge actuator so that it may react to irregularities in the track or disk.

The sledge actuator may be an actuator operating in steps, each step being smaller than the displacement range of the platform actuator.

The sledge may comprise the optical beam generating means, platform with actuator, lens and detector and further means, which together form a pick-up unit.

Such an optical disk drive apparatus is disclosed in for example WO 2004/013848, the contents of which is included in the present specification by reference.

The radial and axial displacement of the lens is normally controlled by a servo mechanism that controls the actuators so that the lens follows the concentric or spiral tracks carrying the digital information on the medium. One example of such control systems is disclosed in U.S. Pat. No. 5,173,598, the contents of which is included in the present specification by reference.

A system has been developed, which enables printing of visible information on at least one side of the medium, for example the top side, while the optical, for the eye invisible digital information is accessible from the bottom side of the medium or disk. The medium is provided with an integral layer that can be influenced by a laser and changed to a color or gray scale. Thus, an image such as text can be printed on the top side of the disk.

Similar systems may have a printable label attached to the disk, such as by an adhesive. The label may be printed by a laser or by in ink jet provided on a printing head.

When printing on a rotating disk, the printing head can no longer be controlled by a servo mechanism as described above, since there are no tracks to follow. However, the demand on accuracy is high, since the printing still will take place along concentric circles or a spiral trajectory with a very small distance between the circles or spiral.

The image to be printed may be constructed in a computer and converted to radial coordinates. The image coordinates are then output to the laser that prints the image at the disk. Such a system is described in for example U.S. Pat. No. 6,771,297, the contents of which is included in the present specification by reference. The requirement on precise positioning is emphasized in U.S. Pat. No. 6,771,297.

The positioning accuracy is provided, according to U.S. Pat. No. 6,771,297, by calibration of the drive for the printing head in separate calibration areas provided at the label side of the disk, normally at the outer periphery of the disk and/or close to the inner radius. The printing head is brought to these areas and the sensitivity of the printing head is determined and used for the subsequent positioning of the printing head in the radial direction. Moreover, the spindle motor is calibrated so that the correct angular positions may be obtained. Then, the print file is transferred to the printing head and the label is printed.

Such a print process may take up to 20 minutes depending on the amount of data that is to be printed. However, the printing head will produce heat and the heat will influence on the calibration parameters.

At a certain time, the calibration is no longer valid and a recalibration is required. Then, the printing head is moved to the calibration area and a recalibration is performed. The printing head is moved back to the print area and the printing is continued. However, it may be difficult to get the printing head back to exactly the same position where the printing was discontinued and often a discontinuity in the printing is produced.

The platform actuator displaces the lens in both the radial and the axial direction. However, the sensitivity of the actuator in the radial direction may be affected by the position of the lens in the axial direction. Thus, the calibration of the radial sensitivity taking place at the inner and/or outer radius of the disk may not be valid at the actual position of the lens. Recalibration it not a solution in this case.

Such differences in the axial position may be caused by the fact that the calibration area is arranged at a different disk layer than the printing area with a significantly different optical axial position. Moreover, the disk may be irregular, for example being unflat or having an umbrella shape. Furthermore, there may be a misalignment of the spindle motor.

The object of the present invention is to propose a method and a device for operating an actuator so that recalibrations may be minimized.

Another object of the invention is to propose a method and device for operating an actuator for compensating for different sensitivity at different temperatures and/or axial position of the actuator.

These objects are met with a method and device as defined in the appended patent claim 1. Further features are defined in the sub claims.

According to a first aspect of the invention, there is provided a method for generating a control voltage for a position actuator of a disk drive system for displacing a lens of a pick-up unit to a given position, wherein the actuator is operated by an open loop control system According to the invention, the method comprises calibration of the control system for producing a control voltage from an input position signal to the control system; processing said control voltage in a feed forward system for generating a processed control signal; feeding said processed control signal to said position actuator for displacing said lens to said position.

According to an embodiment, a property dependent on an axial distance of the lens of the pick-up unit from a calibrated axial position, a Z-value, is measured for use by the feed forward system. Moreover, a property dependent on a temperature of the pick-up unit may be measured for use by the feed forward system.

The processed control signal may be processed in dependence of an estimated distance of the lens from a calibrated axial position and/or an estimated temperature of the pick-up unit.

The position actuator may operate according to the formula:

$$Xdc = Va\_p * K(Temp, Z) / (R(Temp) * C(Temp, Z))$$

in which
Xdc=position signal for said given position
Va_p=Va processed
K=property of 'actuator' 21: Newton/Ampere
R=resistance of 'actuator' coil
C=Spring constant in Newton/meter In the calibration step, at least one of said parameters K, R, C is calibrated.

In another embodiment, the dependencies of temperature and Z-value of said parameters are estimated, and the processing step involves compensation of the dependency of said parameters by adjusting the control voltage to the processed control voltage.

In a further embodiment, the processed voltage is calculated according to the formula:

$$Va\_p = Xact\_setp * Cal * S(Temp\_cal, Z\_cal) / S(Temp\_write, Z\_write) \quad (FIG.\ 2)$$

in which
Cal is the result of the calibration as described for example in U.S. Pat. No. 6,771,297, $$S(Temp\_cal, Z\_cal) = (A\_T + B\_T * Temp\_cal + C\_T * Temp\_cal^2) * (A\_Z + B\_Z * Vz\_cal + C\_Z * Vz\_cal^2),$$

$$S(Temp\_write, Z\_write) = (A\_T + B\_T * Temp\_write + C\_T * Temp\_write^2) * (A\_Z + B\_Z * Vz\_write + C\_Z * Vz\_write^2),$$

wherein
A_T, B_T, C_T, A_Z, B_Z, C_Z are constants,
Vz is the voltage across the Z actuator,
Temp_cal and Vz_cal are the temperature and Vz, respectively, during calibration,
Temp_write and Vz_write are the temperature and Vz, respectively, during writing.

In another aspect of the invention, there is provided a device for carrying out the method as described above.

Further objects, features and advantages of the invention will appear from the following detailed description of embodiments of the invention with reference to the appended drawings, in which.

Figure 1:
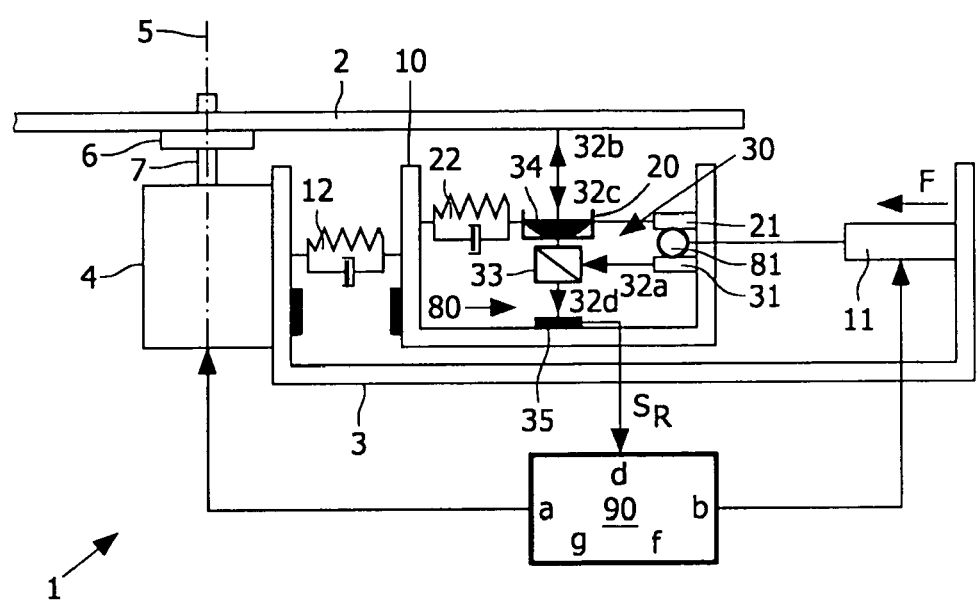
FIG. 1 is schematic cross-sectional view of an optical drive in which the present invention may be used.

FIG. 1 schematically shows an optical disc drive 1 for receiving an optical disk 2 for reading or writing. The drive 1 comprises housing 3 including a motor 4 having a rotation axis 5. Disk 2 is retained by a hub 6 mounted on a spindle shaft 7.

Moreover, the housing comprises a pick-up unit in the form of a sledge 10 substantially linearly moveable in the radial direction of disk 2. The sledge 10 is moved by a radial sledge actuator 11 exerting a force F on the sledge. The actuator constitutes a radial coupling between sledge 10 and housing 3 having characteristics of elasticity, stiffness and damping as shown at 12. The actuator 11 may be a linear motor, a stepper motor or a worm gear motor.

Moreover, the pick-up unit comprises a platform 20 arranged at the sledge and being displaceable in the radial and axial directions. A platform actuator 21 constitutes a radial and axial coupling between the platform and the sledge and has the characteristics of elasticity, stiffness and damping as shown at 22. The platform actuator 21 may be a piezoelectric transducer or an electromagnetic transducer having a coil and a magnet, which may be permanent or electric.

The disk drive further comprises an optical system 30 including a light beam generator 31, such as a laser, for example a laser diode, mounted in the sledge. The light beam 32a thereof passes a beam splitter 33 and an objective lens 34 arranged on the platform 20.

The pick-up unit further comprises a focus servo means arranged for axially displacing the platform 20 in order to achieve and maintain focusing of the light beam 32b exactly on the desired location of the disk 2, but such focus servo means is not illustrated in the Figure for sake of clarity. The light beam 32 follows an optical path 80, which is substantially fixed in relation to sledge 10.

The disk drive 1 further comprises a control unit 90 having a first output connected to spindle motor 4 and a second output connected to sledge actuator 11. An additional output may be connected to platform actuator 21 (not shown). The control unit 90 generates appropriate control signals to the motor and the actuators as is well known in the field and is not further described here.

The radial movement direction is referred to as the X-direction. The direction perpendicular to the disk is referred to as the Z-direction. The direction perpendicular to X and Z is referred to as the Y-direction.

The light beam 32a is reflected 90° upwards as light beam 32b and reaches the disk 2 at the bottom surface thereof and reads data or write data on said surface. Light beam 32c reflected from the surface passes downward through the lens 34 and beam splitter 33 as light beam 32d and reaches a detector 35 where the light is detected. Detector 35 produces an output signal $S_R$ that is used as input signal to control circuit 90.

The optical drive 1 described above is one example of a system in which the invention may be used.

When a label should be provided on a disk with any previously known system, a printing head is used The printing head may be a light source, such as a laser, or any other means for producing a visible marking on the disk surface, on a label attached to the disk, for example by adhesive, or on a surface embedded in the disk and integral therewith. More specifically, the printing head may be the same laser as used for writing or reading on the optical disk. However, the optical disk is reversed to print on the label surface.

Else, a separate printing head may be arranged above or below the disk. Such a printing head may be connected to sledge 10 to move in unison with said sledge. Alternatively, such separate printing head may have a drive of its own. A skilled person understands the different options.

The radial and angular position of such a printing head may be required to be controlled in a very precise manner in order to form a desired pattern on the label or disk surface. Such a printing procedure may take relatively long time, up to 20 minutes or more. Such printing procedure should be carried out in one single step to avoid discontinuities that otherwise may occur.

Thus, such system is provided with calibration procedures. A calibration pattern is imprinted in advance on the disk label side, close to the periphery or outer radius and/or close to the inner radius so that it is out of way for the label. Before starting a printing procedure, the sledge is moved to its extreme position, at the inner position and/or the outer position, and a calibration takes place.

The sensitivity in the radial or X direction of the platform actuator 21 is calibrated at the prevailing temperature. This may take place by reading sawtooth-shaped indicia arranged for example adjacent the outer radius of the disk. The sensitivity of the sledge actuator 11 is normally not calibrated, but the starting position is measured, for example at the inner radius or inner end position of the sledge. This is because the temperature does not appreciably influence on the sensitivity of the sledge actuator 11. However, if the sledge actuator sensitivity is temperature dependent, it may also be calibrated.

Moreover, the axial position or Z-position is calibrated.

Thus, the control system is able to convert a desired X-coordinate to a suitable voltage Va to be applied to the actuators to position lens at the desired radial distance from the rotation axis 5. The signal is supplied to voltage driver that generates voltages to the actuators, which moves the sledge and the platform to the X-position.

However, during such a printing operation, the laser produces a great amount of heat, which influences on the calibration. After some time, the calibration is no longer valid and the actuators move the pick-up unit to the wrong X-coordinate. When a certain error is encountered, such as the fact that the temperature has changed by a specific amount or a specified time has elapsed, a new calibration takes place by moving the pick-up unit to one of its calibration position and performing a recalibration. This is, however, a time consuming process.

However, since the pick-up unit before recalibration was not at the right position by some error distance, it is now impossible to place the pick-up unit at the same position and continue the printing operation and a discontinuity may arise in the printing, which may be more or less visible.

Moreover, the LF sensitivity of the radial actuator is influenced by its Z-position. Recalibration does not work when different Z-value affects the accuracy during calibration and use.

Thus there is a need to compensate for differences in DC or low frequency parameters between the calibration of the X actuator and the use of the X actuator. The actuator operates in open loop, since there is no sensor for measuring the position of the actuator.

Figure 2:
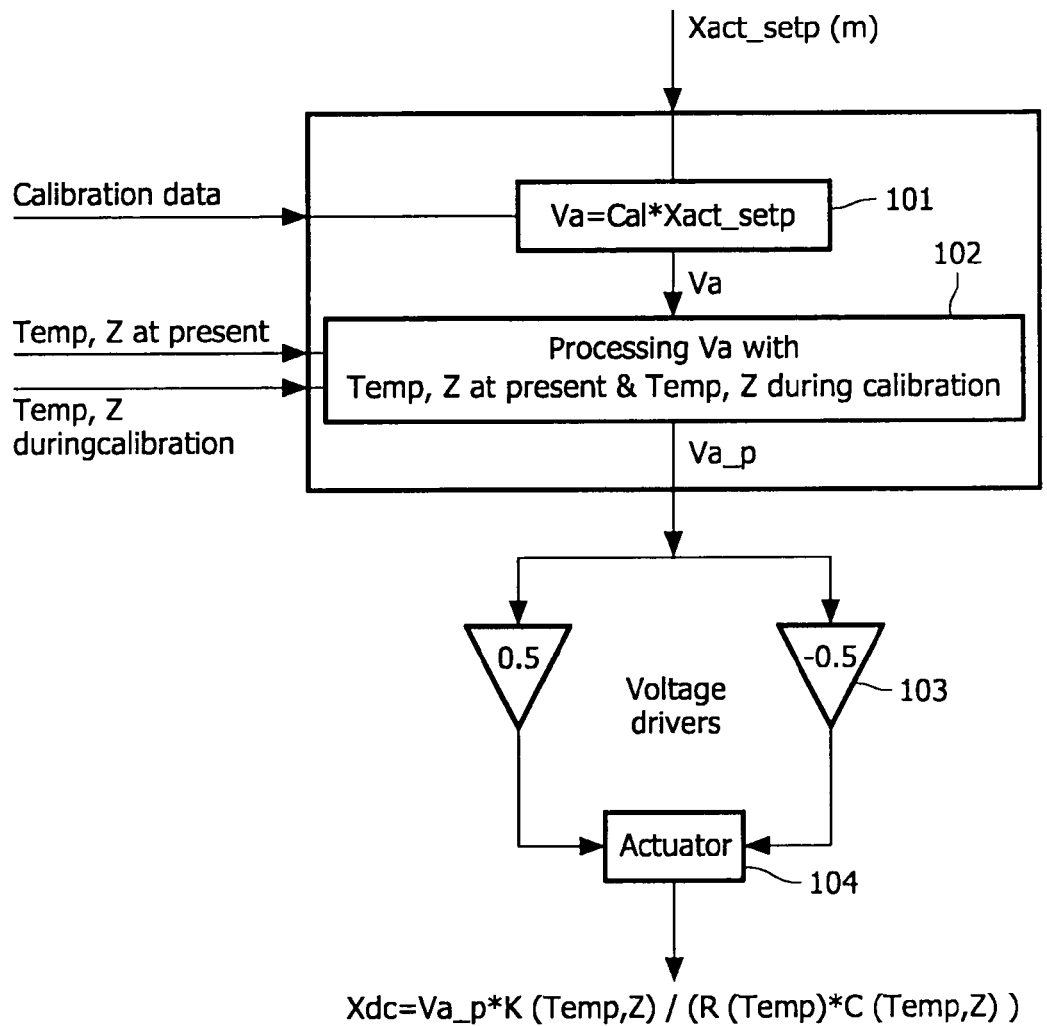
FIG. 2 is a block diagram of the method according to the invention.

According to the invention, this problem is solved as shown in FIG. 2 by using an estimated or measured actuator temperature and estimated or measured Z position to process the control voltage.

If a setpoint Xact_setp is given, calibration data is used to translate this Xact_setp into a control voltage Va=Cal*Xact_setp as shown in block 101.

The control voltage is processed in block 102 with Temperature, Z at present and Temperature, Z during calibration as input signals and generates a processed control voltage Va_p.

The processed control voltage is fed to voltage drivers 103 which influence on X actuator that produces a displacement of pick-up unit to position Xdc according to the formula:

$$Xdc=Va\_p*K(Temp,Z)/(R(Temp)*C(Temp,Z))$$

Xdc=position signal for said given position
Va_p=Va processed
K=property of 'actuator' 21: Newton/Ampere
R=resistance of 'actuator' coil
C=Spring constant in Newton/meter
K, R and C are functions of Temp and Z.

Thus, Va is processed into Va_p with the temperature and Z values during calibration and the present use of the actuator so that the translation of Xact_setp is correct for every temperature and Z during present use. This may be accomplished by means of a temperature sensor on the pick-up unit and by means of a relationship, e.g. given by the manufacturer of the pick-up unit, between the X actuator sensitivity and Temp and Vz.

$$Sx=S(Temp,Z)=(A\_T+B\_T*Temp+C\_T*Temp^2)*(A\_Z+B\_Z*Vz+C\_Z*Vz^2)$$

in which Temp is the (measured) temperature and Vz is the voltage across the axial actuator.

Consequently, the following formula may be used for the processed control voltage:

$$Va\_p=Va*S(Temp\_cal,Z\_cal)/S(Temp\_write,Z\_write)$$

The constants A_T, B_T, C_T, A_Z, B_Z, C_Z may be obtained from the manufacturer of the actuator. Alternatively, the constants may be measured by a specially designed optical disk having calibration areas at different depth and consequently different Z-values. The calibration disk is run under different temperatures to obtain the temperature dependency.

Moreover, data from the operation of the drive may be collected and used for adapting the constants.

Thus, inaccuracies in the calibration constants are counteracted by a feed forward system so that a processed control signal is generated which puts the pick-up unit in the correct X-position.

In spite of the fact that the present invention counteracts errors, the pick-up unit should be calibrated as often as possible. Such calibration should be done at least before each printing operation. Moreover, if there is a break in the printing process, recalibration may take place. If the label is divided in several images, one image may be printed and the pick-up unit may be recalibrated before the next image is printed.

If the pick-up unit is recalibrated during a printing procedure, discontinuities are normally not produced, because the pick-up unit was in proper position due to the feed forward correction of the position. Thus, substantially exactly the same position is obtainable after recalibration.

The invention may be embodied in software and the different blocks 101-104 may be performed in a single circuit or completely in software.

FIG. 1 shows a sensor 81 for temperature arranged between actuator 21 and laser 31. Instead of using a separate temperature sensor, the temperature may be estimated e.g. by measuring the resistance of the actuator coil.

The Z-value may be estimated from the voltage Vz across or current through the axial actuator.

The Z-value or the axial position may be influenced by several factors. The axial position of the disk surface may shift because of surface irregularities. Moreover, the disk may be non-plane, such as having an umbrella shape, which produces different axial positions at different radial distances from the centrum. There may be a misalignment between the surface of the disk and the movement direction of the sledge and/or the platform, for example the fact that the spindle shaft is not exactly 90° in relation to the sledge movement. Moreover, in the case of a label, the calibration area may be arranged at a different depth compared to the label again resulting in different axial positions.

The invention has been described above in relation to an optical drive unit having the ability to write an image at a label of an optical disk. However, the invention can be used at other drives than optical drives, such as at magnetic disk drives. Moreover, also the normal operation of a read or write optical pick-up unit can be enhanced by using the inventive method of adjustment of the control voltage in dependence of measured temperature and/or Z-values.

The invention can be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Above, the invention has been described in relation to certain embodiment shown on the drawings. However, such embodiments do not limit the invention but are only for illustrating the invention. The invention may be modified and completed in different manners as occurs to a person reading the specification and such modifications are intended to be within the scope of the invention. The invention is only limited by the appended patent claims.

The invention claimed is:

1. A method for generating a control voltage for a position actuator of a disk drive system for displacing a lens of a pick-up unit to a given position, wherein the actuator is operated by an open loop control system, said method comprising:
    calibration of the control system for producing only a single control voltage (Va) from an input position signal (Xact_setp) to the control system;
    processing only said single control voltage (Va) in a feed forward system for generating only a single processed control signal (Va_p), wherein said processing of only said single control voltage (Va) is performed as a function of the present axial (Z) position of the actuator, the present temperature, the (Z) position of the actuator during calibration, and the temperature during calibration,
    feeding only said single processed control signal to said position actuator for displacing said lens to said given position
    wherein said calibration step calibrates at least one of parameters K, R and C,
    where K=property of 'actuator': Newton/Ampere
    R=resistance of 'actuator' coil
    C=Spring constant in Newton/meter.

2. The method as claimed in claim 1, further comprising measuring a property dependent on an axial distance of the lens of the pick-up unit from a calibrated axial position, a Z-value, for use by said feed forward system and a temperature of the pick-up unit are measured.

3. The method as claimed in claim 1, further comprising measuring a property dependent on a temperature of the pick-up unit for use by said feed forward system.

4. The method as claimed in claim 1, in which said processed control signal is processed in dependence of an estimated distance of the lens from a calibrated axial position and/or an estimated temperature of the pick-up unit.

5. The method as claimed in claim 1, in which said position actuator operates according to the formula:

$$Xdc=Va\_p*K(\mathrm{Temp},Z)/(R(\mathrm{Temp})*C(\mathrm{Temp},Z))$$

in which
    Xdc=position signal for said given position
    Va_p=a processed control voltage
    K=property of 'actuator' 21: Newton/Ampere
    R=resistance of 'actuator' coil
    C=Spring constant in Newton/meter.

6. The method as claimed in claim 5, in which the dependencies of temperature and Z-value of said parameters are estimated, and said processing step involves compensation of the dependency of said parameters by adjusting said control voltage to said processed control voltage.

7. The method as claimed in claim 1, wherein said processed voltage is calculated according to the formula:

$$Va\_p=Xact\_setp*Cal*S(\mathrm{Temp\_cal},Z\_\mathrm{cal})/S(\mathrm{Temp\_write},Z\_\mathrm{write})$$

in which
    Cal is the result of the calibration $$S(\mathrm{Temp},Z)=(A\_T+B\_T*\mathrm{Temp}+C\_T*\mathrm{Temp}^2)*(A\_Z+B\_Z*Vz+C\_Z*Vz^2)$$

wherein
    A_T, B_T, C_T, A_Z, B_Z, C_Z are constants;
    Vz is the voltage across the Z actuator,
    Temp_cal and Vz_cal are the temperature and Vz, respectively, during calibration,
    Temp_write and Vz_write are the temperature and Vz, respectively, during writing.

8. A device for carrying out the method as claimed in claim 1, for generating a control voltage for a position actuator of a disk drive system for displacing a lens of a pick-up unit to a given position, wherein the actuator is operated by an open loop control system, said device comprising:
    a calibration means for calibration of the control system for producing only a single control voltage (Va) from an input position signal (Xact_setp) to the control system;
    a processing means for processing said only single control voltage in a feed forward system for generating only a single processed control signal (Va_p);
    a position actuator for receiving said processed only single control signal and for displacing said lens to said given position
    wherein said calibration means calibrates at least one of parameters K, R and C, where K=property of 'actuator': Newton/Ampere
R=resistance of 'actuator' coil
C=Spring constant in Newton/meter.

9. The device as claimed in claim 8, further comprising a temperature sensor.

10. The device as claimed in claim 8, further comprising a means for estimating the axial distance of the pick-up unit from a calibrated axial position, a Z-value, for example by means of an input of the actual actuator driver or by means of its output.

11. A method for generating a control voltage for a position actuator of a disk drive system for displacing a lens of a pick-up unit to a given position, wherein the actuator is operated by an open loop control system, said method comprising:
   calibration of the control system for producing a control voltage (Va) from an input position signal (Xact_setp) to the control system;
   processing said control voltage in a feed forward system for generating a processed control signal (Va_p);
   feeding said processed control signal to said position actuator for displacing said lens to said given position wherein said position actuator operates according to the formula:

$$Xdc = Va\_p * K(\text{Temp}, Z) / (R(\text{Temp}) * C(\text{Temp}, Z))$$

in which
   Xdc=position signal for said given position
   Va_p=Va processed
   K=property of 'actuator' 21: Newton/Ampere
   R=resistance of 'actuator' coil
   C=Spring constant in Newton/meter.

12. The method as claimed in claim 11, in which said calibration step calibrates at least one of said parameters K, R, C.

13. The method as claimed in claim 11, in which the dependencies of temperature and Z-value of said parameters are estimated, and said processing step involves compensation of the dependency of said parameters by adjusting said control voltage to said processed control voltage.

* * * * *